United States Patent
Sadowksi et al.

(10) Patent No.: US 8,537,890 B2
(45) Date of Patent: Sep. 17, 2013

(54) VIDEO DECODER WITH ADAPTIVE OUTPUTS

(75) Inventors: Greg Sadowksi, Cambridge, MA (US); Wai Ki Lo, Richmond Hill (CA); Haibo Liu, Scarborough (CA); Stephen Edward Smith, Harvard, MA (US)

(73) Assignee: ATI Technologies ULC, Markham, Ontario (CA)

( * ) Notice: Subject to any disclaimer, the term of this patent is extended or adjusted under 35 U.S.C. 154(b) by 1396 days.

(21) Appl. No.: 11/728,016

(22) Filed: Mar. 23, 2007

(65) Prior Publication Data

US 2008/0232460 A1 Sep. 25, 2008

(51) Int. Cl.
*H04N 7/12* (2006.01)
(52) U.S. Cl.
USPC ........... 375/240.01; 375/E7.027; 375/E7.094; 375/E7.171; 375/E7.176; 375/E7.211
(58) Field of Classification Search
USPC .................................................... 375/240.01
See application file for complete search history.

(56) References Cited

U.S. PATENT DOCUMENTS

| | | | | |
|---|---|---|---|---|
| 5,088,053 A * | 2/1992 | Sprague et al. | ............... | 345/535 |
| 5,596,376 A * | 1/1997 | Howe | ............... | 348/718 |
| 5,598,483 A * | 1/1997 | Purcell et al. | ............... | 382/232 |
| 5,970,233 A | 10/1999 | Liu et al. | | |
| 6,175,594 B1 | 1/2001 | Strasser et al. | | |
| 6,209,080 B1 | 3/2001 | Heishi et al. | | |
| 6,297,858 B1 | 10/2001 | Yang | | |
| 6,327,002 B1 | 12/2001 | Rinaldi et al. | | |
| 6,400,765 B1 | 6/2002 | Strasser et al. | | |
| 6,487,248 B1 | 11/2002 | Lim et al. | | |
| 6,577,349 B1 * | 6/2003 | Yamaguchi et al. | ........... | 348/556 |
| 6,674,376 B1 * | 1/2004 | Nishimura | ............... | 341/67 |
| 6,717,989 B1 | 4/2004 | Simsic et al. | | |
| 6,744,472 B1 * | 6/2004 | MacInnis et al. | ............ | 348/441 |
| 6,859,877 B2 * | 2/2005 | Maeda | ............... | 713/180 |
| 7,061,942 B2 * | 6/2006 | Noronha et al. | ............... | 370/537 |
| 7,190,368 B2 * | 3/2007 | Linzer et al. | ............... | 345/536 |
| 7,653,265 B2 * | 1/2010 | Ruggiero | ............... | 382/303 |
| 2003/0185306 A1 | 10/2003 | MacInnis et al. | | |
| 2003/0206553 A1 * | 11/2003 | Surcouf et al. | ............... | 370/419 |
| 2004/0042554 A1 | 3/2004 | Ishizuka et al. | | |
| 2004/0125204 A1 | 7/2004 | Yamada et al. | | |
| 2004/0268329 A1 | 12/2004 | Prakasam | | |
| 2005/0286639 A1 * | 12/2005 | Aggarwal et al. | ........ | 375/240.25 |
| 2008/0170613 A1 | 7/2008 | Tian et al. | | |
| 2008/0218628 A1 | 9/2008 | Oku et al. | | |
| 2010/0194993 A1 | 8/2010 | Kuno | | |

OTHER PUBLICATIONS

Chakravorty, Rajiv; Banerjee, Suman; Ganguly, Samrat. MobiStream: Error-Resilient Video Streaming in Wireless WANs using Virtual Channels. INFOCOM 2006. Pub. Date: 2006. Relevant pp. 1-14. Found on the World Wide Web at: http://ieeexplore.ieee.org/stamp/stamp.jsp?tp=&arnumber=4146895.*

(Continued)

*Primary Examiner* — Nathan Flynn
*Assistant Examiner* — Jeremiah Avery
(74) *Attorney, Agent, or Firm* — Volpe and Koenig, P.C.

(57) ABSTRACT

In one aspect, there is provided a video decoder including a first write port to write uncompressed video data to a first buffer in a first format adapted based on a format required by the video decoder. The video decoder also includes a second write port to write uncompressed video data to a second buffer in a second format adapted to provide the uncompressed video data for subsequent processing external to the video decoder.

24 Claims, 4 Drawing Sheets

(56) References Cited

OTHER PUBLICATIONS

International Organization for Standardization et al., "Information Technology—Generic Coding of Moving Pictures and Associated Audio Information—Part 7: Advanced Audio Coding (AAC)", ISO/IEC 13818-7, Fourth Edition, (Jan. 15, 2006).

International Telecommunication Union, "Series H: Audiovisual and Multimedia Systems, Infrastructure of Audiovisual Services—Coding of Moving Video", Advanced Video Coding for Generic Audiovisual Services, Amendment 1: Support of Additional Colour Spaces and Removal of the High 4:4:4 Profile, H.264, (Mar. 2005).

International Telecommunication Union, "Series H: AudioVisual and Multimedia Systems, Infrastructure of Audiovisual Services—Coding of Moving Video", Advanced Video Coding for Generic Audiovisual Services, H.2646, (Mar. 2005).

* cited by examiner

VIDEO DECODER WITH ADAPTIVE OUTPUTS

FIELD

The present disclosure generally relates to image processing.

BACKGROUND

Processing of video data often includes receiving a stream of video data and rendering for presentation on a display device. The video data includes video frames and/or video fields. Typically, video frames are generated for presentation on composite display devices, such as cathode ray tube (CRT) monitors, high definition (HD) televisions, and/or liquid crystal display (LCD) panels, while video fields are typically presented on interlaced devices such as traditional television sets. A video coder may compress the video data before storage or transmission.

To display or further process the video data, the video data (also referred to as image data, image data bit stream, digital video, or video data stream) may be processed by a variety of devices including a video decoder. The video decoder may process (e.g., decompress) video data compressed in accordance with a standard, such as H.264, MPEG-2, MPEG4, VC-1, and the like. For example, the MPEG-2 standard prescribes an architecture for an MPEG-2 video decoder including aspects such as a variable length decoding section, an inverse quantization section, an inverse discrete cosine transform section, a motion compensator section, and memory. Likewise, the Blue Ray disc format prescribes H.264 for video compression of high definition (HD) video stored on the Blue Ray disc, and prescribes H.264 for the decompression of any video played back from that disc. When the video decoder includes coding mechanisms (e.g., a compression section to compress uncompressed video data), the video decoder is referred to as a video coder-decoder (or codec).

The implementation of any video decoder architecture is complex and thus costly. Moreover, the complex processing requires additional memory to process the video data and requires additional bandwidth to handle the complex processing. The additional memory may require substantial die area on a chip, which increases the cost of implementing the video decoder and its associated memory on an integrated circuit. Therefore, there continues to be a need to process video data in an efficient manner.

SUMMARY

The subject matter disclosed herein provides methods and apparatus, including computer program products, for providing a video decoder.

In one aspect, there is provided a video decoder including a first write port to write video data to a first buffer in a first format adapted based on an input format required by the video decoder. The video decoder also includes a second write port to write uncompressed video data to a second buffer in a second format adapted to provide the uncompressed video data for subsequent processing external to the video decoder.

Variations may include one or more of the following features. The first write port may include a first address calculation module for determining memory address information and control information based on whether the video data is in a frame mode or a field mode and based on the first format. The first write port may also include a first data packing module for writing the video data to the first buffer at one or more locations determined by the address calculation module. The second write port may include a second address calculation module for determining memory address information and control information based on whether the video data stream is in a frame mode or a field mode and based on the second format. The second write port may also include a second data packing module for writing the video data to the second buffer at one or more locations determined by the address calculation module. The first write port may use the field mode when the video data is interlaced and use the frame mode when the video data is not interlaced. The determination of whether to write in the frame mode or the field mode may be made on a macroblock basis. The first write port may also control the first write port to write the first format in a block of 16 by 16 when the video data input to the video decoder corresponds to H.264. The video decoder may also include a memory including one or more buffers for storing a first output of the first write port and for storing a second output of the second write port. The first write port may also write video data to the first buffer in the first format adapted based on the input required by a motion compensator section of the video decoder. The first write port may dynamically adapt writing of video data to the first buffer. The video decoder may also include an application programming interface for receiving a first call enabling configuration of the first write port to write to the first buffer and for receiving a second call enabling configuration of the second write port to write uncompressed video data to the second buffer.

The subject matter described herein may be implemented to realize the advantages of reducing memory bandwidth and providing more efficient use of memory when decoding video with a video decoder.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

BRIEF DESCRIPTION OF THE DRAWINGS

In the drawings.

Like labels are used to refer to same or similar items in the drawings.

DETAILED DESCRIPTION

Figure 1:
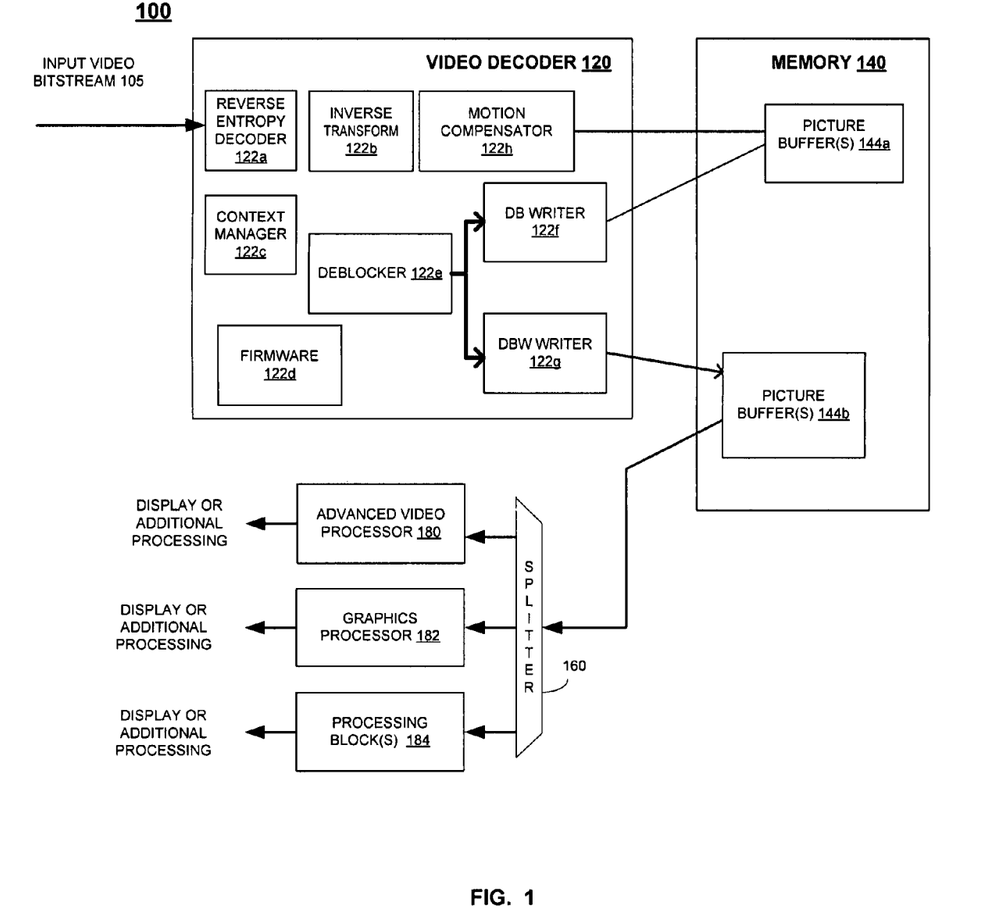
FIG. 1 depicts a block diagram of a video decoder including a first write port adapted for the video decoder and a second write port adapted for another device.

FIG. 1 depicts a system 100 including a video decoder 120, a memory 140, a splitter 160, and follow-on processing modules, such as an advanced video processor 180, a graphics processor 182, and one or more other processing blocks 184.

The video decoder 120 receives video data as an input video bit stream 105. The input video bit steam may be in any format including any compressed video data format, such as MPEG-1, MPEG-2, MPEG-4, H.264, and VC-1. The video decoder 120 processes the input video bit stream 105 using a variety of sections (also referred to as modules) including a reverse entropy decoder 122a, an inverse image transform (e.g., a discrete cosine transform (DCT)) 122b, a motion compensator 122h, a de-blocker 122e, a DB writer 122f, and a DBW writer 122g.

The reverse entropy decoder 122a (also referred to as entropy decoding) is a technique used to decode large amounts of data by examining the frequency of patterns within the data. In particular, a reverse entropy decoder may be used to decompress data by replacing symbols represented by codes (where the length of each codeword is proportional to the negative logarithm of the probability) with symbols represented by equal-length codes. Examples of reverse entropy encoders and decoders include CABAC (Context-based Adaptive Binary Arithmetic Coding) and Huffman coding.

The inverse transform 122b performs an inverse transform (e.g., a DCT) of the compressed video to decompress the video data. The inverse transform is often performed in blocks of pixels that are 8 pixels by 8 pixels (8×8). The 8×8 block represents a portion of an image (e.g., a frame or fields) of video data. Once the video data has been processed by the inverse transform, additional decoding, such as inverse quantization and motion prediction, is performed to further decompress and recover the original, uncompressed video data. Although FIG. 1 depicts inverse transform 122b, other coding and/or compression mechanisms may be used.

Once inverse transform 122b decompresses the video data, motion compensator section 122h generates the fully decoded video images. Motion compensator 122h uses predictive coding to predict future frames from previous frames. For example, if an image sequence includes moving objects, then their motion within an image scene (or sequence) can be measured, and this information may be used to predict the content of other frames in the sequence.

In some implementations, a context manager 122c is used in video decoder 120 to provide context information when decoding macroblocks. In particular, a frame of a video image may be divided into an array of macroblocks. In the case of H.264, video decoder 120 may process the video data as a 16×16 block of picture samples or pixels. For example, inverse transform, motion compensation, de-blocking, and the like may process the video data in blocks of 16×16 pixels. In this example, information about the current macroblock being processed and any neighboring macroblocks may be used as context information to enable processing by the video decoder 120.

De-blocker 122e processes decompressed video images to smooth edges between adjacent blocks. For example, an image having a size of 1920 pixels by 1080 pixels may be divided into blocks of 8×8, 8×16, and 16×16. However, when used, de-blocking may improve image quality by smoothing the edges between blocks.

DB writer 122f writes to one or more buffers, such as picture buffers 144a in memory 140. The DB writer 122f is a write port for writing to picture buffer 144a in a format adapted to the requirements of video decoder 120, video input bit stream 105, and, in some cases, the requirements of picture buffer 144a. In particular, video decoder 120 may write to picture buffers 144a to enable motion compensator 122h as well as other processing sections. Moreover, DB writer 122f may be implemented to write, under the control of a central processing unit (CPU) and firmware 122d, in a variety of formats (e.g., a tile format and/or a linear format) to provide video data in a format required by video decoder 120 and its internal processing sections (or modules). For example, the fields of interlaced video data may be stored in buffer 144a in a linear format (i.e., a horizontal line of pixels of a video image is stored in contiguous, increasing memory locations in picture buffer 144a) to provide a deinterlacer of video decoder 120 with video data in a format adapted for deinterlacing and field predication. Alternatively, video data may be stored in picture buffer 144a as tiles (also referred to as blocks). The tiles may be defined by the type of video being processed by the video decoder 120 (e.g., high definition motion compensation usually requires an 8×8 block of pixels).

In some implementations, DB writer 122f dynamically adapts the format of the output written to picture buffer 144a. For example, DB writer 122f may adapt the format based on picture level changes, so that if the so-called "pictures" in the video data change every 30 milliseconds, the output of DB writer 122f may also adapt to such changes. One example of such picture level changes is H.264 Macroblock-Adaptive Frame/Field (MBAFF) coding. When a MBAFF mode is used in a compressed bit stream, field encoding or frame encoding may change from macroblock to macroblock. Moreover, the DB writer 122 may write in an interlaced format or a progressive format based on the encoding used on any given macroblock. Furthermore, when MBAFF is used, the video data may change from an actual frame of actual picture information to one or more fill frames.

TABLE 1 below provides example output formats of DB writer 122f and when they would be used. The formats listed in Table 1 (e.g., tiled, interleaved fields, etc.) may change (i.e., adapt) on a macroblock basis, and information indicating the format of each macroblock can be stored and then used whenever each macroblock is processed (e.g., read from the picture buffer 144a).

TABLE 1

| Adapted Output Format Stored at Picture Buffer 144a | Use |
| --- | --- |
| Tiled, interleaved fields | Motion compensation |
| Tiled, stacked fields | Motion compensation |
| Linear, interleaved fields | Motion compensation |
| Linear, stacked fields | Motion compensation |

DBW writer 122g is a write port that writes in a variety formats (e.g., a tile format and/or a linear format) to provide video data in the format required for display and/or follow-on processing, both of which are external to the video decoder 120. For example, the video output of DBW 122g may be written, under the control of firmware 122d, to picture buffer 144b in a linear format (e.g., a horizontal line of pixels of a field of a video image is stored in contiguous, increasing memory locations in picture buffer 144b). The contiguous, increasing memory locations in picture buffer 144b are output to splitter 160 and an advanced video processor 180 for further processing before presentation at a monitor, HD television, or the like. In addition, video data may be stored in picture buffer 144b as tiles for a graphics processing unit 182 (e.g., 3-D graphics engine or graphics accelerator) for further processing and/or display. The output of DBW 122g may be written to buffer 144b in a digital display format, such as YUV, YCbCr, and the like. The output format of the DBW writer 122g is adapted to requirements external to the video decoder 120, such as the requirements of a follow-on graphics-processing unit or the requirements for a display. TABLE 2 below provides example formats and when they would be used.

TABLE 2

| Adapted Output Format Stored at Picture Buffer 144b | Use |
|---|---|
| 16x16, 8x8, tiled, stacked fields, etc. | H.264 video video post-processing (color space conversion, re-sampling, de-interlacing, etc.) |
| 16x16, 8x8, tiled, interleaved fields, etc. | Video post-processing (color space conversion, re-sampling, de-interlacing, etc.) |
| Linear, stacked fields | De-interlacing and other video post-processing operations |
| Linear, interleaved fields | De-interlacing and other video post-processing operations |

The memory 140 may be implemented as any form of memory including RAM (random access memory), DRAM (dynamic RAM), SRAM (Static RAM), and any other mechanism of electronic data storage. Although FIG. 1 depicts memory 140 as separate from video decoder 120, in some implementations, memory 140 may be included within the same package or die as video decoder 120.

Figure 2:
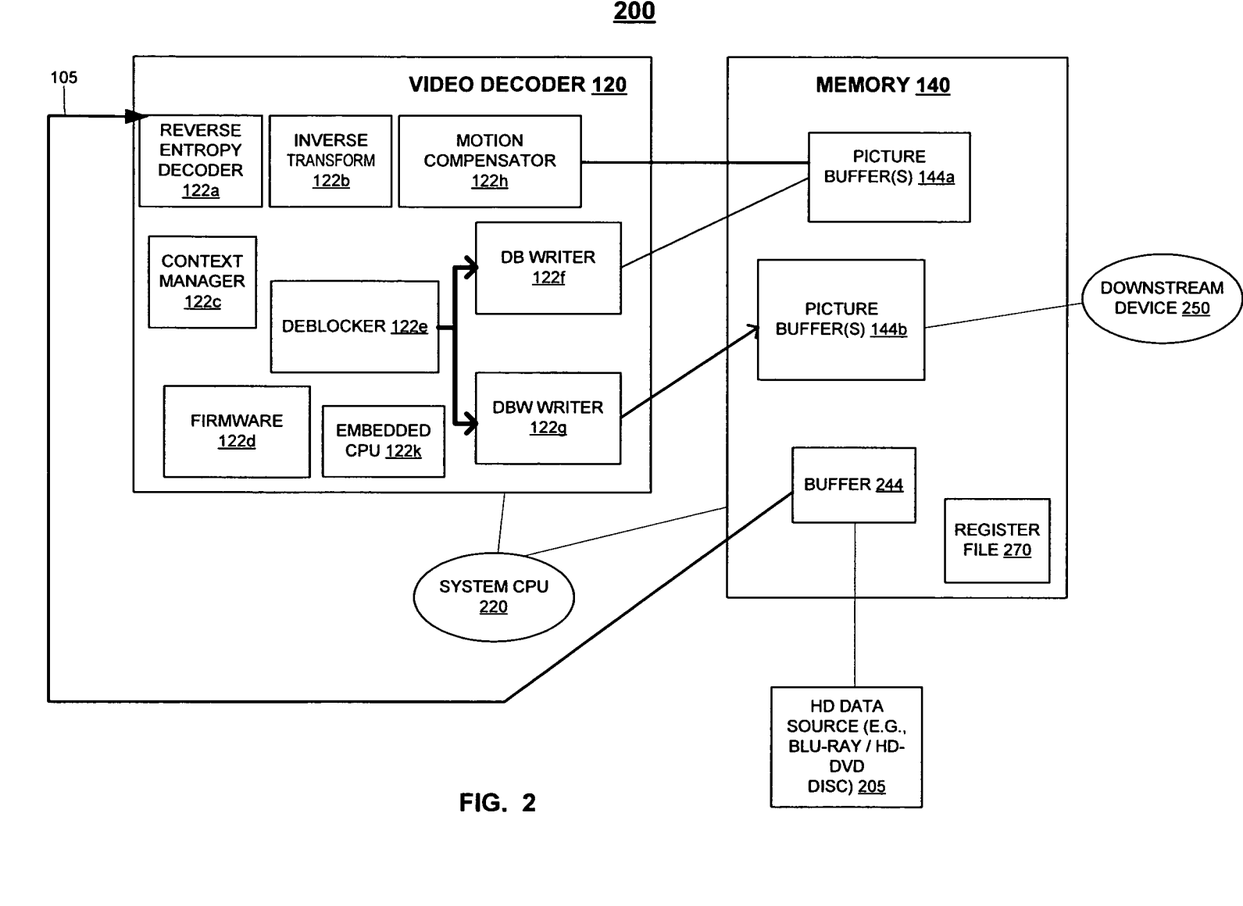
FIG. 2 depicts a block diagram of the video decoder of FIG. 1 implemented in a high definition (HD) system.

FIG. 2 depicts an example implementation of video decoder 120. The system 200 is similar in many respects to FIG. 1, but further depicts a high definition (HD) data source 205, such as an HD-DVD or a Blue Ray disc. These HD data sources 205 provide compressed video data compliant with H.264. The HD data source 205 provides compressed video data that is stored at buffer 244. The buffer 244 then provides the H.264 video data to video decoder 120 as input video bit stream 105. Under the control of an embedded CPU 122k and firmware 122d, video decoder 120 provides decompressed video data in a digital format (e.g., YUV or YcbCr) to picture buffer 144b, which subsequently provides the decompressed video data to a downstream device 250, such as a display, a graphics engine, or the like.

The system CPU 220 and a register file 270 configure video decoder 120 and DBW writer 122g to provide an output adapted to the H.264 video input. The register file 270 may also include information to configure DB writer 122f to provide an output adapted to the H.264 video input as well as the sections of video decoder 120.

In some implementations, video decoder 120 includes an application programming interface (API), which can be called by an external device, such as a DVD player, media player (e.g., Windows Media Player), HD data source 205, and the like. For example, a device, such as a Windows Media Player or Blue Ray DVD player, may read a specific type of media (e.g., H.264 formatted video data), and a component, such as an interface, at the device may then call the API of video decoder 120 to provide information to enable the configuration of DW writer 122f and buffer 144a as well as the configuration of DBW writer 122g and picture buffer 144b. Based on information provided by the device, the call would enable adaptation of the format of the output provided to buffers 144a and 144b.

Figure 3:
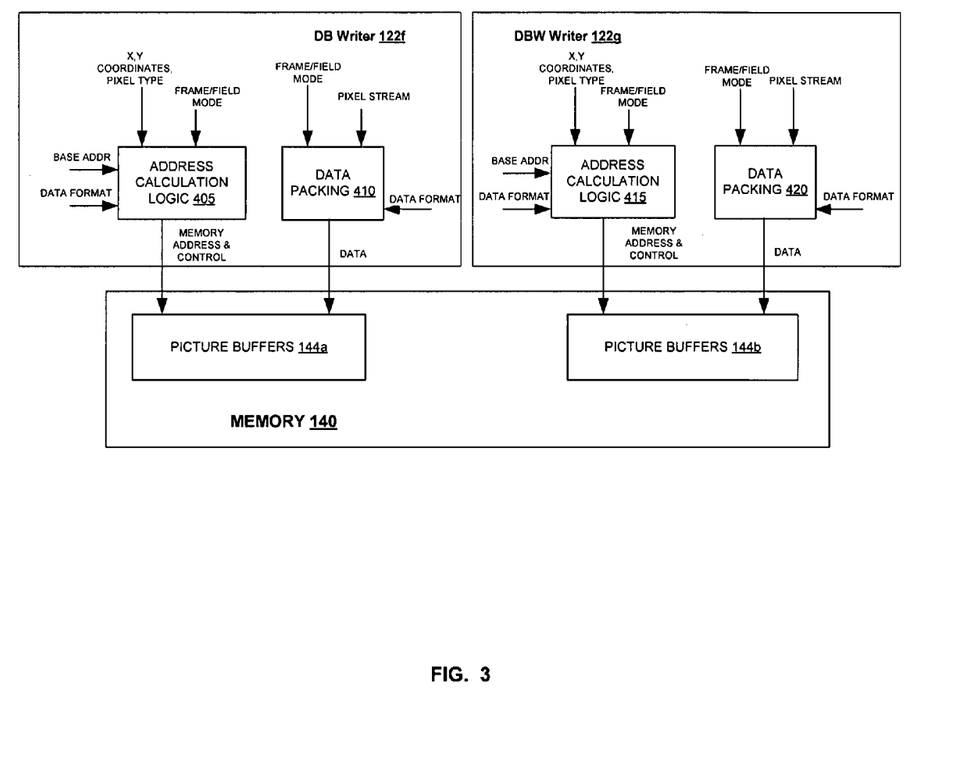
FIG. 3 depicts an implementation of the write ports of the video decoder of FIG. 1.

FIG. 3 depicts an implementation of the write ports of DB writer 122f and the DBW writer 122g. The DB writer 122f may include address calculation logic 405 for determining the memory address locations in which to write video data. The DB writer 122f may also include a data packing module 410 for preparing the data for writing to memory 140. For example, if a frame of a video image were interlaced, each horizontal line (e.g., a field) of pixels would be stored in contiguous memory address locations in picture buffer 144a. In this example, address calculation logic 405 may receive an initial base address and data format. Moreover, address calculation logic 405 may also receive an indication that the mode is field as well as X, Y coordinate pixel information.

Given the aforementioned, address calculation logic 405 calculates the memory address for each pixel of the field (i.e., memory address for each pixel of the horizontal line of pixels) and provides control signals for writing to memory 140. Meanwhile, data packing module 410 receives a video data (e.g., a horizontal line of pixels) and organizes the video data for writing at the calculated address of memory 144a.

In the case of a frame of a video image in a tile format (e.g., in 16×16 blocks), each block in the frame of pixels would be stored in contiguous memory address locations in picture buffer 144a. The address calculation logic 405 would receive an initial base address and data format, image size, image resolution, an indication that the mode is frame since the video data is non-interlaced (e.g., progressive) video data, and X, Y coordinate pixel information. Next, address calculation logic 405 calculates the memory address for the video data associated with each pixel of the block (e.g., a 16×16 block) and provides control signals to enable writing to memory 140. Meanwhile, data packing module 410 receives a block and organizes the block for writing in contiguous memory addresses. For example, video data associated with the top left most pixel of a 16×16 block may be written to memory 140 first, and the video data associated with the remaining 15 pixels in the top row may be subsequently written to memory 140 before writing video data for other pixels in the next row of the block, although other writing schemes may be used instead. Outputs of module 405 and 410 are the memory address, memory data, and various control signals necessary to perform the write cycles to memory buffers 144a. Outputs of module 415 and 420 are the memory address, memory data, and various control signals necessary to perform the write cycles to memory buffers 144b.

The frame/field mode inputs to address calculation logic 405 and data packing 410 are provided by a configuration register, which can be written to by a processor using firmware. The frame/field mode inputs to address calculation logic 415 and data packing 420 are provided by another configuration register, which can be written to by a processor using firmware. The pixel stream inputs of data packing modules 410 and 420 is provided by a de-blocker module, which produces the de-blocked block of pixels to be used by a motion predictor (e.g., as reference frames) or to be used by video post-processing modules. The x,y coordinates, pixel type inputs of address calculation logic 405 and 415 are provided by a de-blocker module. The x,y coordinates, pixel type information represents display screen locations of the associated pixel stream data as well as the type of pixel data. The type of pixel data may indicate that certain pixels are supposed to be written to certain memory buffers and only by DB writer 122f. The data format input of data packing 410 is provided by a configuration register, which can be written to by a processor using firmware. The data format input of data packing 420 is provided by another configuration register, which can be written to by a processor using firmware.

Figure 4:
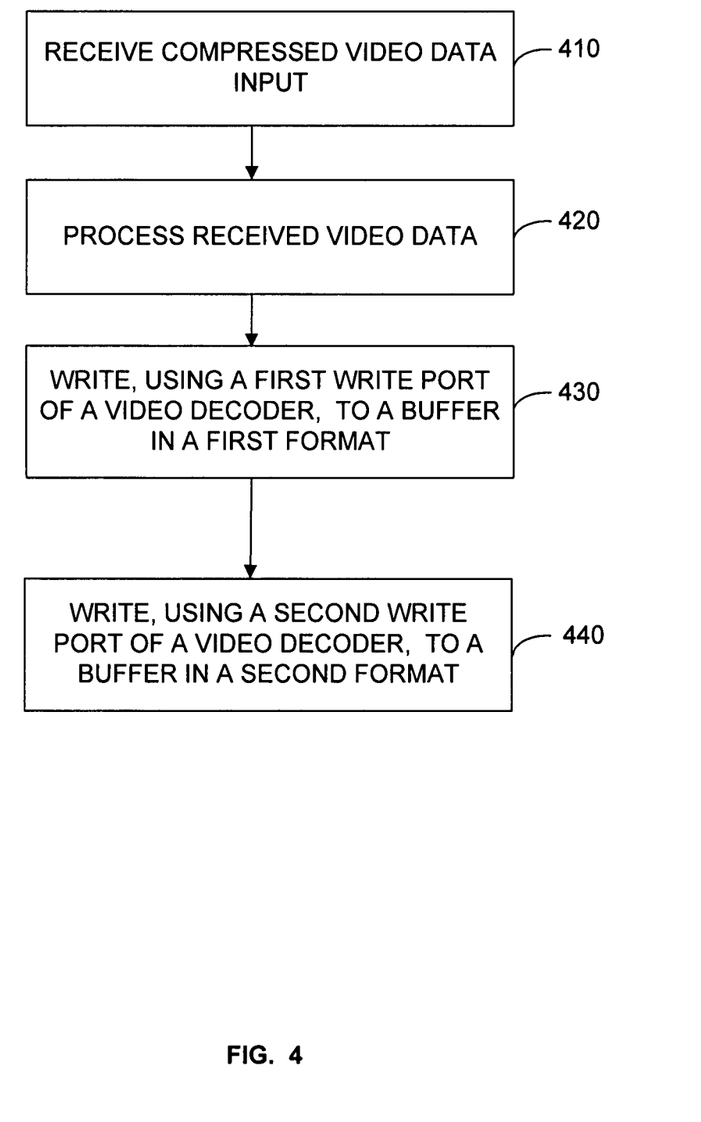
FIG. 4 depicts a process for providing two video decoder outputs, the first output adapted to the video decoder, and a second output adapted to another device.

FIG. 4 depicts a process for video decoding using two write ports, one write port adapted to write in a format dictated by the video decoder, and another write port adapted to write in another format dictated by another device, such as a display or follow-on processor. At 410, video decoder 120 receives compressed video data, such as input video data stream 105.

At 420, video decoder 120 processes input video data stream 105, so that the video data is decompressed. For example, video decoder 120 may include an inverse DCT section to process the compressed video data to yield decompressed video data.

At 430, video decoder may write using DB writer 122f the uncompressed video data to picture buffer 144a. The video data written to picture buffer 144a may be formatted based on the requirements of the video decoder 120. In some implementations, DB writer 122f may write to picture buffer 144a in a format adapted for an input of one of the sections of video decoder 120. For example, DB writer 122f may write to picture buffer 144a video data formatted as reference frame images for use by motion compensator 122h.

At 440, video decoder 120 may write using DBW writer 122g video data to picture buffer 144b. The video data written to picture buffer 144b is formatted based on the requirements of components external to video decoder 120. For example, video data written by DBW writer 122g to picture buffer 144b may be formatted in 16×16 blocks for a 3-D graphic engine or may be written in another digital format for presentation. In some implementations, video decoder 120 may more efficiently process video data by using two write ports (e.g., DB writer 122f and DBW writer 122g), each adapted to write to buffers 144a and 144b using a specified format—thus minimizing waste of memory resources at buffers 144a and 144b when compared to approaches using a single write port.

In some implementations, the subject matter described herein may use two write ports to decouple internal memory buffers of a video decoder from output memory buffers of a video decoder, so that, for example, a video player application may dictate, on a frame-by-frame basis, the format of the decoded video data output.

Although the above describes de-interlacing as part of the video decoder, de-interlacing may also be implemented as part of Advanced Video Processor 180.

Moreover, although the above describes particular image processing protocols as examples (e.g., H.264 and VC1), embodiments may be used in connection any other type of image processing protocols and standards. Although the above describes a video decoder, a video encoder may also be implemented using aspects similar to those described above. Furthermore, any implementations described herein might be associated with, for example, an Application Specific integrated Circuit (ASIC) device, a processor, a video encoder, video decoder, and/or video codec. In addition, to simplify the explanation of the features of the subject matter described herein, FIGS. 1 and 2 depict simplified video decoders including only some of the sections, which may be included in a video decoder. Although the above describes the use of two write ports within the context of a video decoder, a device other than a video decoder may implement the two write ports described herein.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment.

The foregoing description is intended to illustrate but not to limit the scope of the invention, which is defined by the scope of the appended claims. Other embodiments are within the scope of the following claims.

What is claimed:

1. A video decoder comprising:
    a first write port configured to write video data to a first buffer only in a first format based on input requirements of the video decoder; and
    a second write port configured to write uncompressed video data to a second buffer in a second format and configured to provide the uncompressed video data for subsequent processing external to the video decoder.

2. The video decoder of claim 1, wherein the first write port further comprises:
    a first address calculation module for determining memory address information and control information based on whether the video data is in a frame mode or a field mode based on the first format; and
    a first data packing module for writing the video data to the first buffer at one or more locations determined by the address calculation module.

3. The video decoder of claim 1, wherein the second write port further comprises:
    a second address calculation module for determining memory address information and control information based on whether the video data is in a frame mode or a field mode based on the second format; and
    a second data packing module for writing the video data to the second buffer at one or more locations determined by the address calculation module.

4. The video decoder of claim 2, wherein the first write port further comprises:
    using the field mode on a condition that the video data is interlaced; and
    using the frame mode on a condition that the video data is not interlaced.

5. The video decoder of claim 4, further compromising:
    determining whether to write in the frame mode or the field mode based on a macroblock.

6. The video decoder of claim 1, wherein the first write port-is controlled to write the first format in a block of 16 by 16, when the video data input to the video decoder corresponds to H.264.

7. The video decoder of claim 1 further comprising:
    a memory comprising one or more buffers for storing a first output of the first write port and for storing a second output of the second write port.

8. The video decoder of claim 1, wherein writing the video data to the first buffer in the first format is based on input requirements of a motion compensator module of the video decoder.

9. The video decoder of claim 1, wherein the first write port dynamically adapts a format when writing to the first buffer.

10. The video decoder of claim 1, further comprising:
    an application programming interface configured to receive a first call enabling configuration of the first write port of the video decoder, the first write port configured to write video data to the first buffer in the first format based on the input requirements of the video decoder, and for receiving a second call enabling configuration of the second write port to write uncompressed video data to the second buffer in the second format configured to provide uncompressed video data for subsequent processing external to the video decoder.

11. A method implemented in a first device, comprising:
    receiving an input that includes video data, wherein the video data is compressed;
    decompressing the video data;
    writing via a first write port the processed video data to a buffer in order to process the video data, wherein the video data written in only a first format based on input requirements of the first device, wherein the first device is a video decoder; and
    writing uncompressed video data to a second buffer to enable the uncompressed video data to be processed by a second device, wherein the uncompressed video data is written in a second format based on requirements of the second device.

12. The method of claim 11, further comprising:
determining memory address information and control information based on whether the video data is in a frame mode or a field mode based on the second format; and
writing the video data to the second buffer at one or more locations determined by an address calculation module.

13. The method of claim 12 further comprising:
using the field mode on a condition that the video data is interlaced; and
using the frame mode on a condition that the video data is not interlaced.

14. The method of claim 13, further compromising:
determining whether to write in the frame mode or the field mode based on a macroblock.

15. The method of claim 11 further comprising:
controlling the first write port to write the first format in a block of 16 by 16, when the video data corresponds to H.264.

16. The method of claim 11 further comprising:
writing the video data to the first buffer in the first format based on the input requirements of a motion compensator module of the video decoder.

17. The method of claim 11 further comprising:
dynamically adapting a format when writing to the first buffer.

18. A non-transitory computer-readable storage medium storing a set of instructions for execution by a general purpose processor, the instructions comprising:
a receiving code segment for receiving an input to a first device that includes compressed video data;
a decompressing code segment for decompressing the video data; and
a writing code segment for writing via a first write port of the first device, the video data to a first buffer to enable the first device to process the video data, wherein the video data is written in only a first format based on requirements of a first device, wherein the first device is a video decoder;
wherein the writing code segment is further configured for writing uncompressed video data to a second buffer to enable the uncompressed video data to be processed by a second device, wherein the uncompressed video data is written in a second format configured for the second device.

19. The non-transitory computer-readable storage medium of claim 18 further comprising:
a determining code segment for determining memory address information and control information based on whether the video data is in a frame mode or a field mode based on the second format; and
wherein the writing code segment is further configured for writing the video data to the second buffer at one or more locations determined by the address calculation module.

20. The non-transitory computer-readable storage medium of claim 19 further comprising:
a using code segment for using the field mode on a condition that the video data is interlaced; and
wherein the using code segment is further configured for the frame mode on a condition that the video data is not interlaced.

21. The non-transitory computer-readable storage medium of claim 20 wherein the determining code segment is further configured for determining whether to write in the frame mode or the field mode based on a macroblock.

22. A method comprising:
transmitting a first call to a first application programming interface, the first call enabling configuration of a first write port of a video decoder, the first write port configured to write uncompressed video data to a first buffer in only a first format based on requirements of the video decoder; and
transmitting a second call to a second application programming interface, the second call enabling configuration of a second write port to write uncompressed video data to a second buffer in a second format configured to provide uncompressed video data for subsequent processing external to the video decoder.

23. The method of claim 22, further comprising:
implementing the first call and the second call as a single call; and
implementing the first application programming interface and the second application programming interface as a single application programming interface.

24. A device comprising:
a component for making a first call to an application programming interface of a video decoder, the first call enabling configuration of a first write port to write video data to a first buffer in only a first format based on input requirements of the video decoder, and for making a second call to the application programming interface, the second call enabling configuration of a second write port to write uncompressed video data to a second buffer in a second format configured to provide uncompressed video data for subsequent processing external to the video decoder.

* * * * *

UNITED STATES PATENT AND TRADEMARK OFFICE
CERTIFICATE OF CORRECTION

PATENT NO.        : 8,537,890 B2                                   Page 1 of 1
APPLICATION NO.   : 11/728016
DATED             : September 17, 2013
INVENTOR(S)       : Sadowski et al.

It is certified that error appears in the above-identified patent and that said Letters Patent is hereby corrected as shown below:

TITLE PAGE:

Item (12), column 1, change "Sadowksi" to -- Sadowski --.

Item (75), column 1, change "Sadowksi" to -- Sadowski --.

Item (56), column 2, line 3, change "(Mar. 2005)" to -- Amendment 1, (June 2006) --.

IN THE CLAIMS:

In claim 5, column 8, line 29, change "compromising:" to -- comprising: --.

In claim 6, column 8, line 33, change "port-is" to -- port is --.

In claim 14, column 9, line 13, change "compromising:" to -- comprising: --.

Signed and Sealed this
Eleventh Day of March, 2014

Michelle K. Lee
*Deputy Director of the United States Patent and Trademark Office*